Figure 1:
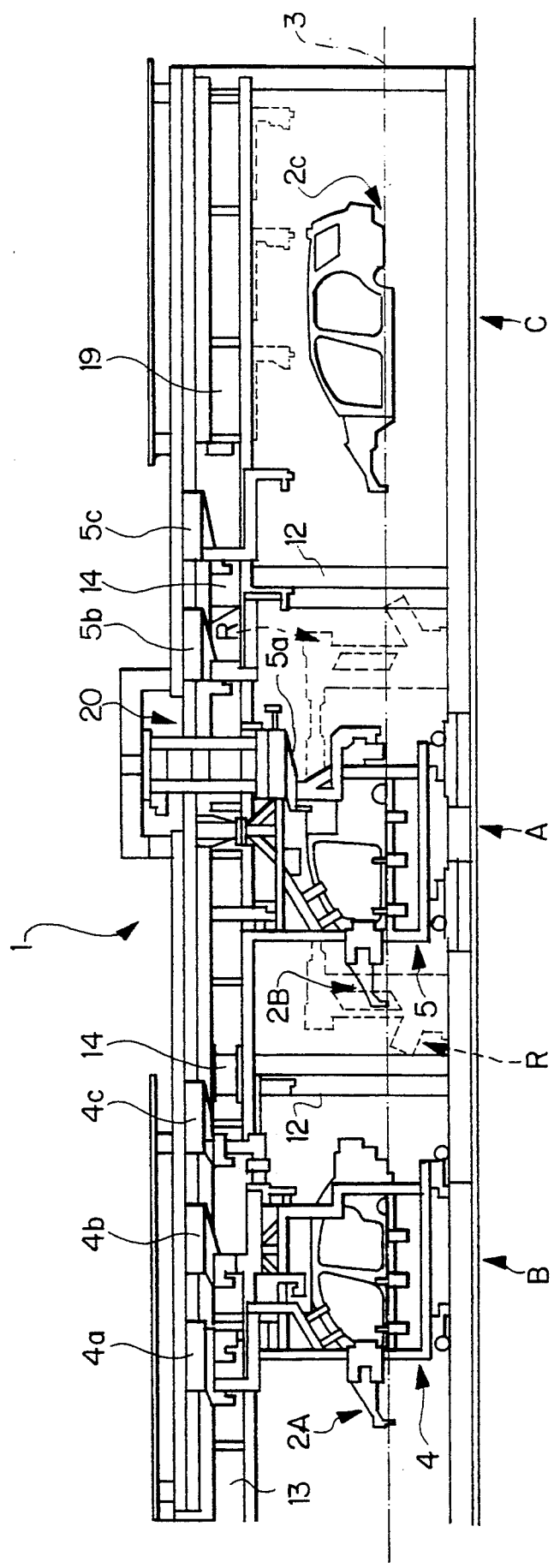

United States Patent [19]

Zampini

[11] Patent Number: 5,397,047
[45] Date of Patent: Mar. 14, 1995

[54] DEVICE FOR SPOT WELDING OF STRUCTURES CONSTITUTED BY SHEET METAL ELEMENTS, PARTICULARLY MOTOR-VEHICLE BODIES

[75] Inventor: Antonio Zampini, Collegno, Italy

[73] Assignee: Comau S.p.A., Grugliasco, Italy

[21] Appl. No.: 245,915

[22] Filed: May 19, 1994

[30] Foreign Application Priority Data

Sep. 20, 1993 [IT] Italy .................. TO93A0691

[51] Int. Cl.⁶ ............................................. B23K 9/007
[52] U.S. Cl. .................................... 228/6.1; 228/49.1;
219/80; 219/86.24; 219/127; 219/158; 219/161;
29/430; 29/464; 29/466; 29/469
[58] Field of Search .................... 228/6.1, 49.1, 212;
219/80, 86.24, 127, 158, 161; 29/430, 464, 466,
469

[56] References Cited

U.S. PATENT DOCUMENTS

| 4,256,946 | 3/1981 | De Candia | 219/158 |
| 4,441,645 | 4/1984 | Takagishi et al. | 219/80 |
| 4,802,616 | 2/1989 | Naruse et al. | 228/49.1 |
| 5,044,541 | 9/1991 | Sekine et al. | 219/80 |

Primary Examiner—Samuel M. Heinrich
Attorney, Agent, or Firm—Sughrue, Mion, Zinn, Macpeak & Seas

[57] ABSTRACT

In a welding device for motor vehicle bodies there are provided a number of pairs of locating gates adapted to operate on different models of body. In the work position, each pair of locating gates can be selectively coupled to a plurality of auxiliary fixtures depending upon the specific version (for example hatchback, sedan, station-wagon) of the model of body to be welded.

5 Claims, 3 Drawing Sheets

DEVICE FOR SPOT WELDING OF STRUCTURES CONSTITUTED BY SHEET METAL ELEMENTS, PARTICULARLY MOTOR-VEHICLE BODIES

The present invention relates to devices for spot welding of structures constituted by sheet metal elements, particularly motor-vehicle bodies, of the type comprising:

a welding station, provided with programmable means for automatic welding, a line for feeding loosely preassembled structures to be welded in sequence to the welding station, two or more pairs of locating gates provided at the welding station in such a way as to be rapidly interchangeable at a work position, said locating gates carrying devices for clamping the elements forming the structure to be welded in the correct mutual assembling position, the gates of each pair being provided with clamping devices adapted to a respective type of structure to be welded, said pairs of locating gates being displaceable on both sides of said line, at the welding station, between rest positions and a work position, so that they are rapidly interchangeable at the work position, the gates of each pair being further movable transversely to said line, when they are at said work position, between inoperative spaced apart positions and operative relatively close positions, in which said clamping devices are able to engage the structure which is at the welding station.

The applicant has been producing welding devices having the above indicated features for a long time (see for example U.S. Pat. No. 4,256,947 and German patent No. 2.810.822). Such welding systems, marketed under the trade mark "ROBOGATE" have produced a turnaround in the technique of spot welding of motor-vehicle bodies. The ROBOGATE system has found extensive application among various car manufacturers throughout the world, due to a number of important advantages with respect to the systems used previously.

Firstly, the system is provided with a high degree of flexibility, i.e. it is able to operate on bodies which are even very different from each other, so that a same line can be used for the production of different models.

Secondly, the system can be adapted with relatively simple and quick operations, and therefore with very low costs, to the production of a new model of body.

Another advantage lies in that a uniform quality on all the models of a same type on which the system operates is ensured.

In the ROBOGATE system of the most classic type (see the above cited prior patents) said locating gates carrying the clamping devices are slidably mounted longitudinally of the line, on both sides thereof. Each pair of locating gates is provided, as indicated above, with clamping devices adapted to a specific model of motor-vehicle. Therefore, if one wished to provide a welding system able to operate on a given number of different models of motor-vehicles, it was necessary to provide the same number of pairs of locating gates aligned in the longitudinal direction of the line. This in practice posed a limit to the number of different models on which the system could operate, since the longitudinal dimension of the welding station cannot be in general greater than a predetermined value.

In order to overcome such inconvenience, the applicant has already proposed in the past various solutions (see for example U.S. Pat. No. 4,682,722, U.S. Pat. No. 4,905,884, U.S. Pat. No. 5,174,488). The system shown in the above cited German patent No. 2,810.822 provided the possibility of installing movable clamping devices on a same locating gate, so that such devices were rapidly interchangeable, different clamping devices being provided on a given gate to operate on different parts of different versions of a same model of a motor-vehicle (for example sedan and station-wagon). Thus, a same pair of locating gates could be used to operate on all the different versions of a same model.

This solution, however, cannot be used when the differences between the various versions of a same model become relevant, also because it is impossible to provide many interchangeable clamping devices of the above indicated type on a single locating gate, because of their dimension.

The object of the present invention is that of providing a welding device of the type indicated at the beginning which is able to solve the above indicate problems effectively and that in particular is provided with a high degree of flexibility and at the same time is of relatively reduced dimensions.

In order to achieve this object, the invention provides a device for spot welding of structures constituted by sheet metal elements, particularly motor-vehicle bodies, comprising:

a welding station, provided with programmable means for automatic welding, a line for feeding loosely preassembled structures to be welded in sequence to the welding station, two or more pairs of locating gates provided at the welding station in such a way as to be rapidly interchangeable at a work position, said locating gates carrying devices for clamping the elements forming the structure to be welded in the correct mutual assembling position, the gates of each pair being provided with clamping devices adapted to a respective type of structure to be welded, said pairs of gates being displaceable on both sides of said line, at the welding station, between rest positions and a work position, so that they are rapidly interchangeable at the work position; the gates of each pair being also displaceable transversely to said line, when they are at said work position, between inoperative spaced apart positions and operative relatively close positions in which said clamping devices are able to engage the structure which is at the welding station, characterized in that said device further comprises, for each pair of locating gates, a plurality of auxiliary fixtures which are displaceable along the line independently from the locating gates, so that a selected auxiliary fixture can be rapidly brought into the welding station, when the respective pair of locating gates is at its work position, and can be coupled to said respective locating gates, said auxiliary fixtures being provided with means for coupling to respective locating gates and having clamping devices which are respectively adapted to engage different parts of different versions of a same model of a motor-vehicle for which said respective pair of locating gates is provided.

Due to the above described features, each pair of locating gates is able to operate on all the different versions of a same model of a motor-vehicle. By the expression "different versions of a same model" there is meant naturally not only the case of slight variations in the body, but also the case of bodies which are substantially different (for example hatchback, sedan, station-wagon) and use the same floor panel. Typically, such versions differ from each other mainly in the rear/upper part of the body. Therefore, in the area of the locating gates which is to engage the rear part of the body to be welded, there are provided means for receiving the auxiliary fixture which at each time is selected in order to complete the equipment of clamping devices which must operate on the body. For example, in the above mentioned case relating to the hatchback, sedan and station-wagon versions of a same model, each pair of locating gates is able therefore to operate on three different types of body, so that a welding station provided with two pairs of locating gates is able to operate on six different types of body, hence with a relatively high flexibility and at the same time with a relatively reduced size.

Naturally, the features of the invention are applicable to any system of the "ROBOGATE" type, independently from the type of movement to which the locating gates are subjected, i.e. both of the conventional type with locating gates which are movable longitudinally of the line on both sides thereof, and with systems of any other type.

Figure 2:
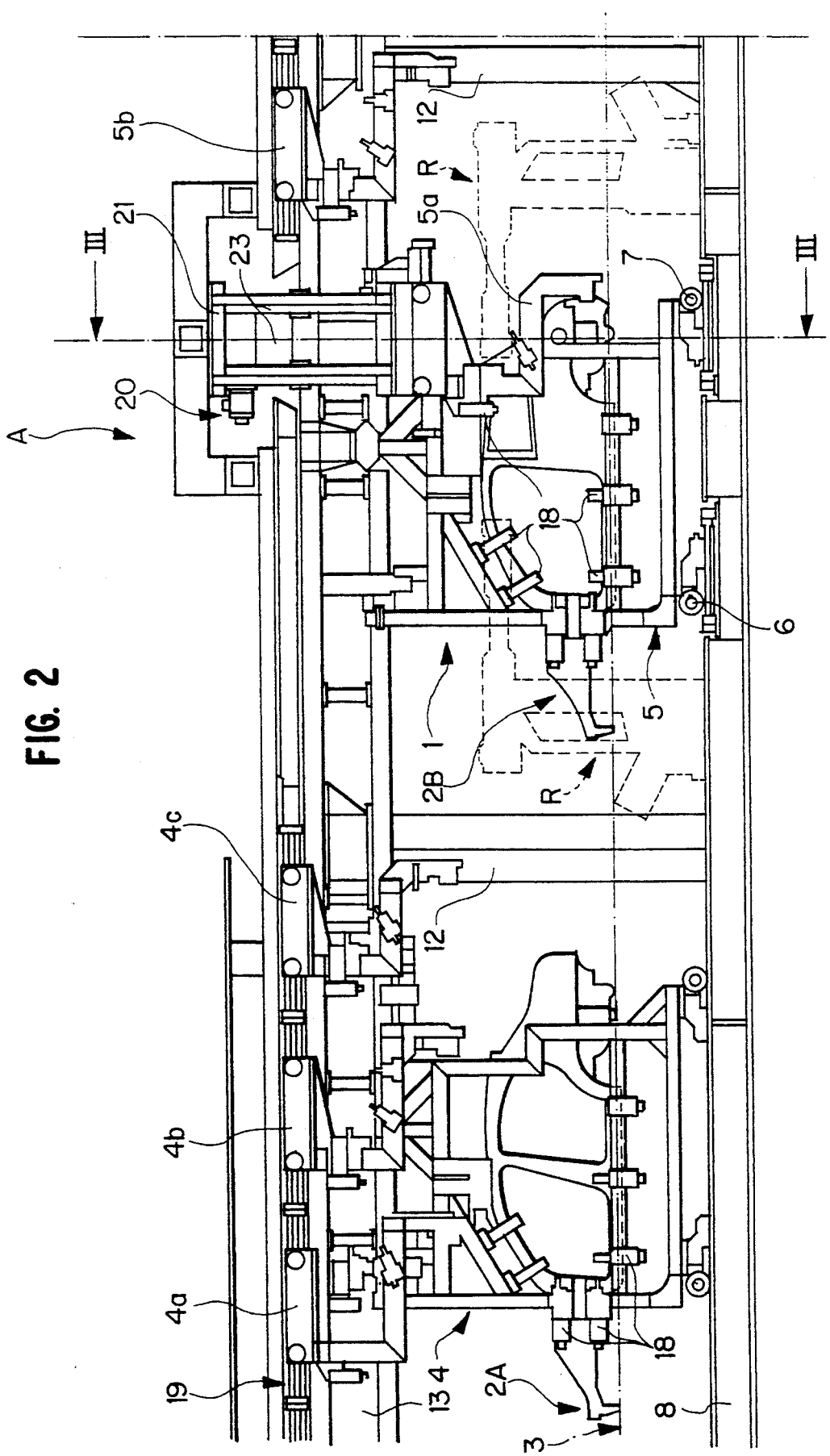
Figure 3:
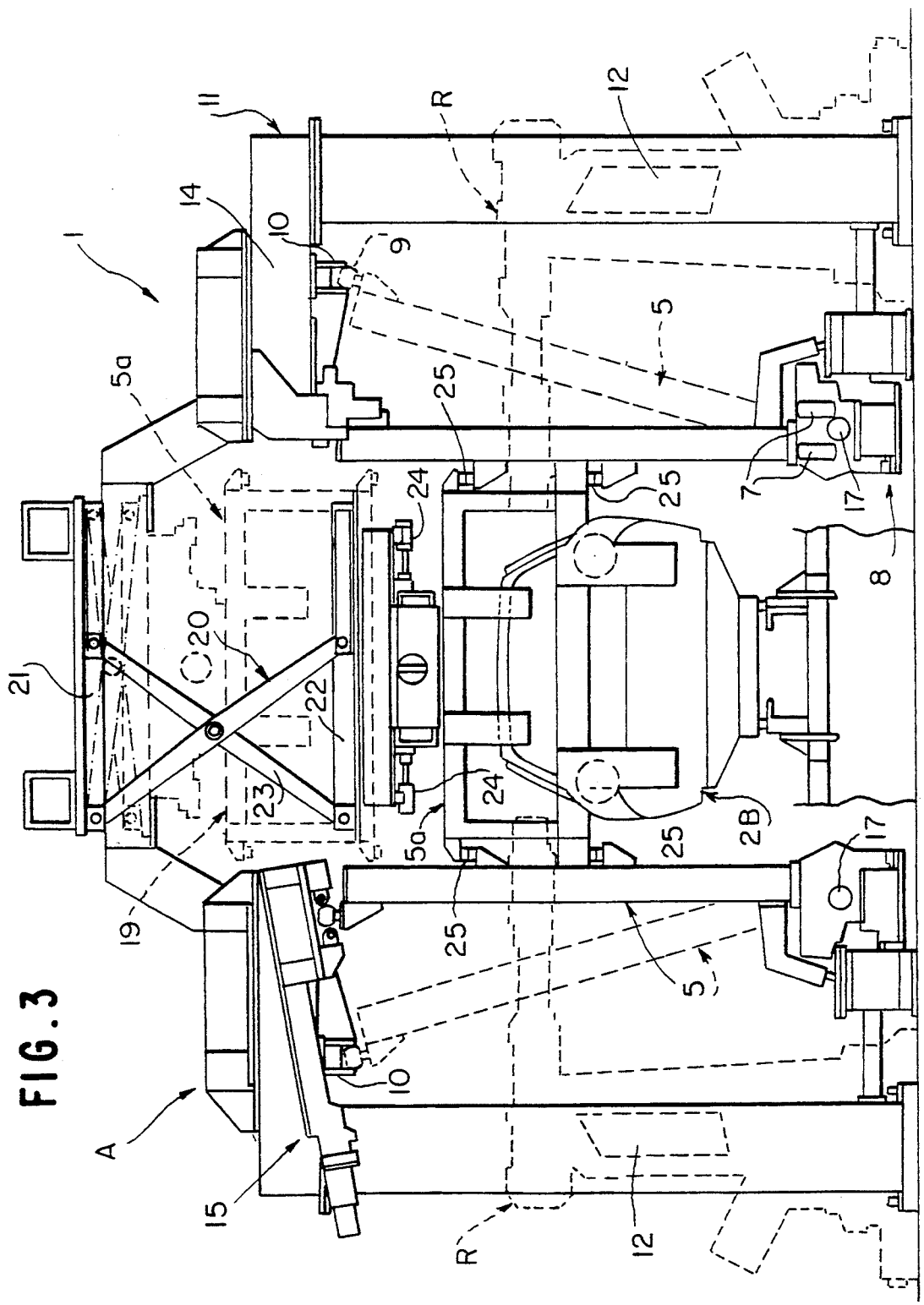

Further features and advantages of the invention will become apparent from the following description with reference to the annexed drawings, given purely by way of non limiting example, in which:

FIG. 1 is a side elevational view of a welding device according to the invention, FIG. 2 is a view on an enlarged scale of a detail of FIG. 1, and FIG. 3 is a cross-sectional view taken along line III—III of FIG. 2.

The embodiment which is shown in the drawings relates to a welding device of the ROBOGATE type with a longitudinal movement of the locating gates. The structure and the general arrangement of this device are explained in the following only in their general lines, as far as the movement of the locating gates is concerned. In particular, the embodiment shown relates to the case in which the locating gates, when they are in the work position, may pivot, in order to move from the inoperative positions to the operative positions, around a longitudinal pivot axis which is located at the lower part of the locating gates.

In the drawings, reference numeral 1 generally designates a station for spot welding of motor-vehicle bodies constituted by sheet metal elements. According to the technique corresponding to the so called "ROBO-GATE" system, the bodies to be welded (in FIG. 1 reference numerals 2A, 2B, 2C respectively designate the three versions, sedan, hatchback and station-wagon, of a same model of the body, the device being able to operate on such three versions as well as on other three versions of a different model of the body) are fed in sequence by a conveyor line 3 to the welding station 1 in a loosely preassembled condition.

The details of construction of the conveyor line 3 are not shown herein since they can be of any known type and they do not fall, taken alone, within the scope of the present invention.

As indicated above, each body reaches the welding station in a preassembled condition. In other words, the body is assembled at least with its main parts (floor panel, sides and upper connecting cross members) at assembling stations located upstream of the welding station shown in FIG. 1. In such assembling stations, the various sheet metal parts are connected provisionally to each other, for example by bending connecting tabs. This provisional coupling is not able to give a well determined geometry to the body, since each element may have small movements with respect to the adjacent element to which it is connected. Therefore, there is the need of positioning the elements forming the body of the motor-vehicle in the correct assembling position before performing spot welding at station 1.

According a technique which is also conventional, the spot welding is preferably carried out by programmable robots R, shown with dotted lines in the drawings, which are programmed according to the type of body to be welded.

On both sides of line 3, there are arranged two pairs of locating gates 4, 5 which are respectively provided with clamping devices adapted to two completely different models of body and able to clamp the elements of the body in a correct mutual position before that spot welding is carried out by the robots. According to a technique which also is known, the two pairs of gates 4, 5 are slidably mounted on both sides of line 3 along the longitudinal direction of the line, so that each pair of gates can be rapidly brought into the work area A (FIGS. 1, 2) when a body of the corresponding model is at such area. In other words, each pair of locating gates 4, 5 can slide longitudinally between said work area A and a waiting or rest area that for locating gates 4 is that indicated by B in FIG. 1, whereas for locating gates 5 is that indicated by C.

As shown in FIG. 3, gates 4, 5 are longitudinally slidably mounted in an upwardly diverging condition. Each gate is provided at its lower part with a carriage including front wheels 6 and rear wheels 7 which roll on planar tracks provided above a fixed base structure 8. At its upper part, each gate is provided with guide wheels 9 which are engaged on longitudinal guides 10. Such guides are supported by a support frame 11 including columns 12, longitudinal pillars 13 (FIGS. 1, 2) and cross members 14. Each guide 10 is displaceable transversely with respect to the longitudinal direction of line 3 by conveyor devices 15 of a type known per se, carried by the frame 11, which are not shown in detail herein, since they do not fall within the scope of the invention. At the same time, the lower tracks on which the carriages of locating gates 4, 5 roll have, at the work area A, separate portions which are pivotally mounted on a fixed structure around a longitudinal axis 17 (FIG. 3).

As it is clearly apparent from FIG. 3, when a pair of locating gates is at the work area A, the two gates can be moved transversely to the longitudinal direction of line 3 by pivoting around axes 17, between inoperative spaced apart positions (shown in dotted lines in FIG. 3) in which the gates diverge upwardly from each other, so as to allow the change of the body at the welding station, and close operative positions, shown with unbroken lines in FIG. 3, in which the gates are arranged substantially in vertical planes parallel to the longitudinal direction of line 3. In this condition, the clamping devices carried by the gates are able to engage corresponding parts of the body which is at the welding station to clamp them in a precise position in which robots R can attend to welding. Also the details relating to the clamping devices 18 are not shown herein since such devices are of a type known per se and do not fall, taken alone, within the scope of the present invention.

According to the invention, the welding device further comprises two series of auxiliary fixtures 4a, 4b, 4c and 5a, 5b, 5c provided with further clamping devices which are to engage the rear part of the three different versions (sedan, hatchback and station-wagon) of the two models of body on which the device operates. When a pair of locating gates 4 or 5 is at the work area A, they must be coupled to any of the three respective auxiliary fixtures 4a, 4b, 4c and 5a, 5b, 5c depending upon the type of body to be welded. Indeed, the locating gates 4, 5 have clamping devices on board which are to engage the parts of body which are identical in the different versions of a same model, whereas the auxiliary fixtures 4a, 4b, 4c and 5a, 5b, 5c are to engage the different parts of the three versions of a same model of body.

To this end, the auxiliary fixtures 4a, 4b, 4c and 5a, 5b, 5c are displaceable longitudinally over the line 3, so that each of them can be brought rapidly to the work area A and be coupled to the respective pair of locating gates 4 or 5.

In the case of the illustrated example (FIG. 3), each auxiliary fixture has a frame which extends transversely to the longitudinal direction of line 3 and substantially fills the whole width of the space between two locating gates 4 or 5 when the latter are in their operative positions at the work area A. All such auxiliary fixtures 4a, 4b, 4c and 5a, 5b, 5c are movable along an overhead conveyor line 19 supported by longitudinal beams 13. The details of construction of conveyor line 19 are not illustrated in the present description and in the annexed drawings, since they can be of any known type and do not fall, taken alone, within the scope of the invention. Furthermore, the deletion of such details from the drawings renders the latter more easy to be understood. The conveyor line 19 for the auxiliary fixtures can be for example a chain-type conveyor line. When one of the auxiliary fixtures reaches the work area A, it is picked up by a pantograph lifting device 20 (FIGS. 2, 3) comprising an upper support 21 anchored to the frame 11 of the welding station, and a lower support 22 which is vertically movable, and connected to the upper support 21 by means of two X-shaped pantographs 23 which are parallel to each other. In FIG. 3, the lifted condition of lower support 22, corresponding to the flattened condition of the two pantographs 23, is shown in dotted line, whereas the unfolded condition of pantograph 23, corresponding to the lowered position of lower support 22, is shown with unbroken line. Lower support 22 is provided at its lower part with bolt devices 24 which engage corresponding holes provided at the upper part of the auxiliary fixture to support the latter during movement of this fixture from the raised position shown with dotted line in FIG. 3 (corresponding to the level of conveyor line 19) and the lowered position shown with unbroken line in FIG. 3, in which reference pins 25 of the fixture engage corresponding seats provided at the locating gates 4 or 5 which were previously brought into their operative positions so that the fixture itself is precisely positioned with respect to the locating gates. At the same time, the precise positioning of the locating gates is ensured by lower pivoting supports.

As already indicated, the auxiliary fixture has clamping devices 18 which are to engage the rear part of the respective version of the body.

The operation of the above described device is as follows:

Along line 3 there are fed, in any sequence, bodies of six different types: three versions (sedan, hatchback and station-wagon) of a first body model and three versions (sedan, hatchback and station-wagon) of a second body model, completely different from the first one. FIG. 1 shows, as already indicated, only the three versions 2A, 2B, 2C of the first model of body.

Every time that the welding of a body at the work area A has been completed, the system automatically recognises, with means which are conventional in this field, whether the following body which is to enter into the welding station is any version of the same model of body which has just been welded or not. If the general model of body is the same, the two locating gates which are at the work area A remain in their positions, independently from whether the following body is of the same version of the model which has just been welded or not. For example, if the body which has been welded is body 2B, i.e. the hatchback version of the first model of body, the system attends firstly to recognising whether the following body corresponds to the same model. In the illustrated example in FIG. 1, the following body is indeed a different version 2C (i.e. the station-wagon version) of the same model of body. In this situation, the locating gates 5 remain in their work positions. When the welding of body 2B has been completed, the clamping devices 18 carried by the locating gates 5 and by the auxiliary fixture 5a are opened and the locating gates 5 reach the opened diverging positions shown with dotted line in FIG. 3, after that pantograph 20 has been lifted. At this point, the conveyor line 3 is activated to bring body 2B which has been welded out of the welding station and to bring a new body to be welded 2C into the welding station. After that the pantograph device 20 has been lifted to bring auxiliary fixture 5a back to the level of the conveyor line 19, the latter is activated to bring the auxiliary fixture 5c which is provided with the clamping devices 18 adapted to engage the rear part of the station-wagon body 2C to the lifting device 20. Once it is picked up by the lifting device 20, fixture 5c is lowered to be coupled to the two locating gates 5 which meanwhile have reached their operative close positions shown with unbroken lines in FIG. 3, immediately after that body 2C has arrived at the welding station. At the end of the welding, the lifting device 20 is raised to disengage the auxiliary fixture 5c from the locating gates 5 and the latter are again opened to allow the welded structure to get out of the welding station. If the following body is of a completely different model, the locating gates 4, 5 are caused to slide rapidly along their guides so that the pair of locating gates 4 corresponding to the other model of body is brought into the work area A. Also in this case, the two locating gates 4 are coupled to one of the auxiliary fixtures 4a, 4b, 4c, in a way similar to what has been described, depending upon the particular version of body to be welded (sedan, hatchback or station-wagon).

Naturally, the details of construction relating to the means for moving the locating gates in order to rapidly interchange such gates at the work area A, the means for moving the locating gates between their inoperative positions and their operative positions when they are at the work area, the means for moving the auxiliary fixtures 19, the structure of such auxiliary fixtures, and the means for coupling such fixtures to the locating gates, can be also different from what has been described in the foregoing purely by way of example.

Naturally, also, while the principle of the invention remains the same, the details of construction and the embodiments may widely vary without departing from the scope of the invention.

I claim:

1. Device for spot welding of structures constituted by sheet metal elements, in particular motor-vehicle bodies, comprising:

a welding station, provided with programmable means for automatic welding, a line for feeding loosely preassembled structures to be welded in sequence to the welding station, two or more pairs of locating gates provided at the welding station in such a way as to be rapidly interchangeable at a work position, said locating gates carrying devices for clamping the elements forming the structure to be welded-in the correct mutual assembling position, the gates of each pair being provided with clamping devices adapted to a respective type of structure to be welded, said pair of gates being displaceable on both sides of said line at the welding station between rest positions and a work position, so as to be rapidly interchangeable at the work position, said gates of each pair being further displaceable transversely to the line, when they are at the work position, between inoperative spaced apart positions and operative close position, in which the clamping devices engage the structure which is at the welding station, wherein said device further comprises, for each pair of locating gates, a plurality of auxiliary fixtures movable along said line independently from the locating gates, so that a selected auxiliary fixture can be rapidly brought into the welding station, when the respective pair of locating gates is at its work position, and can be coupled to said respective locating gates, said auxiliary fixtures being provided with means for coupling to respective locating gates and having clamping devices which are respectively adapted to engage different parts of different versions of a same model of body for which said respective pair of locating gates are provided.

2. Device according to claim 1, in which the locating gates are slidably longitudinally mounted on both sides of said line, wherein said auxiliary fixtures are slidably longitudinally mounted above said conveyor line.

3. Device according to claim 2, wherein it comprises a lifting device adjacent to the work position able to pick up an auxiliary fixture and bring same into a position for coupling to the respective pair of locating gates.

4. Device according to claim 2, wherein the locating gates and the auxiliary fixtures are provided with plug-and-socket coupling means for their respective coupling.

5. Device according to claim 3, wherein there is provided an upper conveyor line for the auxiliary fixtures and that said lifting device has an upper support fixed to a support frame of the welding station and a lower support connected to the upper support by pantograph means so that it can be displaced between a raised position at the level of the upper conveyor line and a lower position for coupling the picked up auxiliary fixture to the respective pair of locating gates.

* * * * *